United States Patent
Kramer et al.

(10) Patent No.: US 12,092,023 B1
(45) Date of Patent: Sep. 17, 2024

(54) STEAM COOLING TURBINE ENGINE COMBUSTOR WALL

(71) Applicant: Raytheon Technologies Corporation, Farmington, CT (US)

(72) Inventors: Stephen K. Kramer, Cromwell, CT (US); Lance L. Smith, West Hartford, CT (US); Zhongtao Dai, West Hartford, CT (US); Gregory Boardman, Owens Cross Roads, AL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/121,503

(22) Filed: Mar. 14, 2023

(51) Int. Cl.
*F02C 3/30* (2006.01)
*F02C 7/18* (2006.01)
*F23R 3/10* (2006.01)

(52) U.S. Cl.
CPC ............... *F02C 3/305* (2013.01); *F02C 3/30* (2013.01); *F02C 7/18* (2013.01); *F23R 3/10* (2013.01); *F23R 2900/03044* (2013.01)

(58) Field of Classification Search
CPC .................................. F02C 3/30; F02C 3/305
USPC ......................................................... 431/160
See application file for complete search history.

(56) References Cited

U.S. PATENT DOCUMENTS

| | | | | |
|---|---|---|---|---|
| 2,847,825 A * | 8/1958 | Spears | ...................... | F02C 7/14 60/797 |
| 3,038,308 A * | 6/1962 | Nancy | ..................... | F02C 7/141 60/730 |
| 3,359,723 A | 12/1967 | Bohensky | | |
| 3,747,336 A * | 7/1973 | Dibelius | ................. | F02C 3/305 60/39.55 |
| 3,785,146 A * | 1/1974 | Bailey | ..................... | F02C 3/305 60/39.55 |
| 3,908,362 A * | 9/1975 | Szydlowski | .............. | F02C 3/30 60/39.27 |
| 4,819,438 A * | 4/1989 | Schultz | .................... | F23M 5/08 165/83 |
| 4,982,564 A | 1/1991 | Hines | | |

(Continued)

FOREIGN PATENT DOCUMENTS

GB 2236145 A * 3/1991 ........... F01K 23/106

OTHER PUBLICATIONS

Schlader, A.F. and Bonneau, H., 1968. Cooling of Flame Tubes by Steam Injection. In Combustion in Advanced Gas Turbine Systems (pp. 313-345). Pergamon. (Year: 1968).*

(Continued)

*Primary Examiner* — Todd E Manahan
*Assistant Examiner* — Marc J Amar
(74) *Attorney, Agent, or Firm* — Getz Balich LLC

(57) ABSTRACT

An assembly is provided for a turbine engine. This assembly includes a housing, a combustor and a steam system. The housing includes an air plenum. The combustor is disposed within the air plenum. The combustor includes a combustion chamber and a combustor wall between the combustion chamber and the air plenum. The steam system includes a steam injector arranged within the air plenum next to the combustor wall. The steam system is configured to inject steam out of the steam injector and into the air plenum to impinge against the combustor wall.

11 Claims, 12 Drawing Sheets

(56) References Cited

U.S. PATENT DOCUMENTS

| | | | | |
|---|---|---|---|---|
| 5,054,279 | A * | 10/1991 | Hines | F01K 21/047 60/39.5 |
| 5,271,218 | A * | 12/1993 | Taylor | F02C 7/222 60/797 |
| 5,301,500 | A * | 4/1994 | Hines | F01D 17/141 60/39.5 |
| 6,077,399 | A * | 6/2000 | Calderon | C10B 39/02 202/229 |
| 6,173,561 | B1 * | 1/2001 | Sato | F23R 3/005 60/757 |
| 6,341,485 | B1 | 1/2002 | Liebe | |
| 6,837,051 | B2 * | 1/2005 | Mandai | F23R 3/06 60/725 |
| 2002/0190137 | A1 * | 12/2002 | Cheng | F23R 3/06 239/128 |
| 2003/0079461 | A1 * | 5/2003 | Mandai | F23M 5/085 60/39.55 |
| 2004/0146399 | A1 * | 7/2004 | Bolms | F23R 3/06 415/175 |
| 2007/0157626 | A1 * | 7/2007 | Bergholz | F01D 5/082 60/782 |
| 2011/0247590 | A1 * | 10/2011 | Donovan | F23R 3/283 123/470 |
| 2012/0060511 | A1 * | 3/2012 | Zuo | F01D 25/14 415/144 |
| 2012/0285175 | A1 * | 11/2012 | Fletcher | F02C 7/18 |
| 2015/0218963 | A1 * | 8/2015 | Alecu | F01D 17/141 60/39.5 |
| 2017/0211479 | A1 * | 7/2017 | Little | F23R 3/005 60/757 |

OTHER PUBLICATIONS

EP Search Report for EP Patent Application No. 24163649.7 dated Jul. 9, 2024.

* cited by examiner

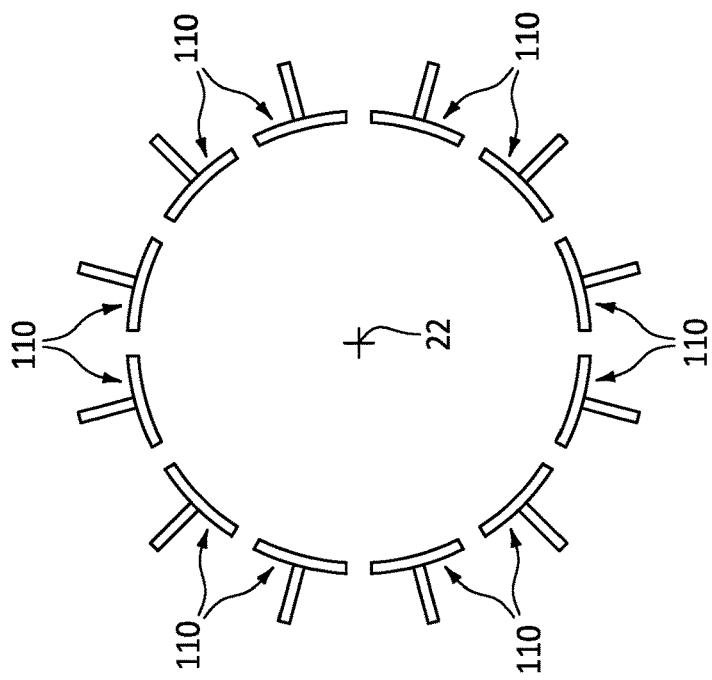
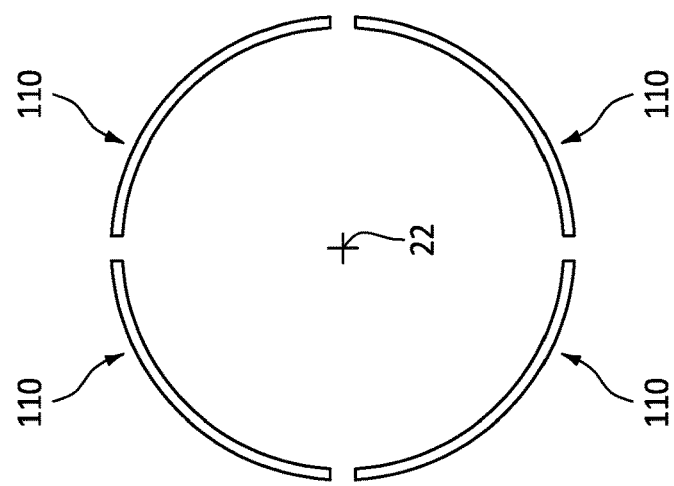
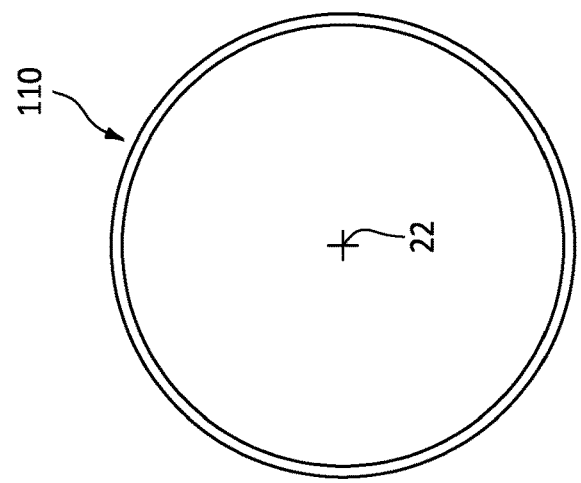
FIG. 11C
FIG. 11B
FIG. 11A

STEAM COOLING TURBINE ENGINE COMBUSTOR WALL

BACKGROUND OF THE DISCLOSURE

1. Technical Field

This disclosure relates generally to a turbine engine and, more particularly, to utilizing steam during operation of the turbine engine.

2. Background Information

As government emissions standards tighten, interest in alternative fuels for gas turbine engines continues to grow. There is interest, for example, in fueling a gas turbine engine with hydrogen ($H_2$) fuel rather than a traditional hydrocarbon fuel such as kerosine to reduce greenhouse emissions. Combustion products produced by combusting hydrogen ($H_2$) fuel include water vapor. Various systems and methods are known in the art for recovering the water vapor. Various system and methods are also known in the art for producing and utilizing steam from the recovered water vapor. While these known systems and methods have various advantages, there is still room in the art for improvement.

SUMMARY OF THE DISCLOSURE

According to an aspect of the present disclosure, an assembly is provided for a turbine engine. This assembly includes a housing, a combustor and a steam system. The housing includes an air plenum. The combustor is disposed within the air plenum. The combustor includes a combustion chamber and a combustor wall between the combustion chamber and the air plenum. The steam system includes a steam injector arranged within the air plenum next to the combustor wall. The steam system is configured to inject steam out of the steam injector and into the air plenum to impinge against the combustor wall.

According to another aspect of the present disclosure, another assembly is provided for a turbine engine. This assembly includes a combustor and a first steam ring. The combustor includes a combustion chamber and a combustor wall forming a peripheral boundary of the combustion chamber. The combustor wall extends circumferentially around and axially along an axial centerline. A first steam ring injector is disposed outside of the combustor and next to the combustor wall. The first steam ring injector includes a plurality of first steam outlets arranged circumferentially around the combustor wall. The first steam ring injector is configured to direct steam out of the first steam outlets to cool the combustor wall.

According to still another aspect of the present disclosure, another assembly is provided for a turbine engine. This assembly includes a combustor and a steam blanket injector. The combustor includes a combustion chamber and a combustor wall forming a peripheral boundary of the combustion chamber. The combustor wall extends circumferentially around and axially along an axial centerline. The steam blanket injector is disposed outside of the combustor and next to the combustor wall. The steam blanket injector includes a plurality of steam outlets and a plurality of ports. The steam outlets are arranged circumferentially around and axially along the combustor wall. The steam blanket injector is configured to direct steam out of the steam outlets to cool the combustor wall. Each of the ports extends through the steam blanket injector to facilitate airflow across the steam blanket injector.

The assembly may also include a second steam ring injector disposed outside of the combustor, next to the combustor wall and axially spaced from the first steam ring injector. The second steam ring injector may include a plurality of second steam outlets arranged circumferentially around the combustor wall. The second steam ring injector may be configured to inject additional steam out of the second steam outlets to cool the combustor wall.

The assembly may also include a compressor section and a diffuser plenum fluidly coupled with and downstream of the compressor section. The combustor and the first steam ring injector may be arranged within the diffuser plenum.

The steam system may be configured to direct a flow of the steam out of the steam injector and into the air plenum along a trajectory to impinge against the combustor wall. The trajectory may be perpendicular to the combustor wall.

The steam system may be configured to direct: a first flow of the steam out of the steam injector and into the air plenum to impinge against a first area of the combustor wall; and a second flow of the steam out of the steam injector and into the air plenum to impinge against a second area of the combustor wall.

The steam system may be configured to direct a flow of the steam out of the steam injector and into the air plenum along a trajectory to impinge against the combustor wall. The trajectory may be angularly offset from the combustor wall by an acute angle greater than forty-five degrees.

The steam injector may include a plurality of steam outlets. The steam system may be configured to direct the steam through the steam outlets into the air plenum to impinge against the combustor wall.

The combustor wall may extend axially along and circumferentially about a centerline. At least some of the steam outlets may be arranged axially along the combustor wall.

The combustor wall may extend axially along and circumferentially about a centerline. At least some of the steam outlets may be arranged circumferentially about the combustor wall.

The steam injector may be configured as a steam showerhead injector.

The steam injector may be configured as a steam rail injector extending circumferentially about the combustor wall.

The steam injector may be configured as a steam blanket injector extending axially along and circumferentially about the combustor wall.

The steam blanket injector may have a lattice configuration.

The steam injector may be a first steam injector, and the steam system may also include a second steam injector arranged within the air plenum next to the combustor wall. The steam system may be configured to inject additional steam out of the second steam injector and into the air plenum to impinge against the combustor wall.

The combustor wall may extend axially along and circumferentially about a centerline. The second steam injector may be axially spaced from the first steam injector along the combustor wall.

The combustor wall may include a plurality of cooling apertures configured to receive cooling air from the air plenum.

The combustor wall may include an array of quench apertures. The steam injector may be offset from the array of quench apertures.

The assembly may also include a compressor section. The air plenum may be fluidly coupled with and downstream of the compressor section.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 11A-C are schematic illustrations of various steam injectors arrangements.

DETAILED DESCRIPTION

Figure 1:
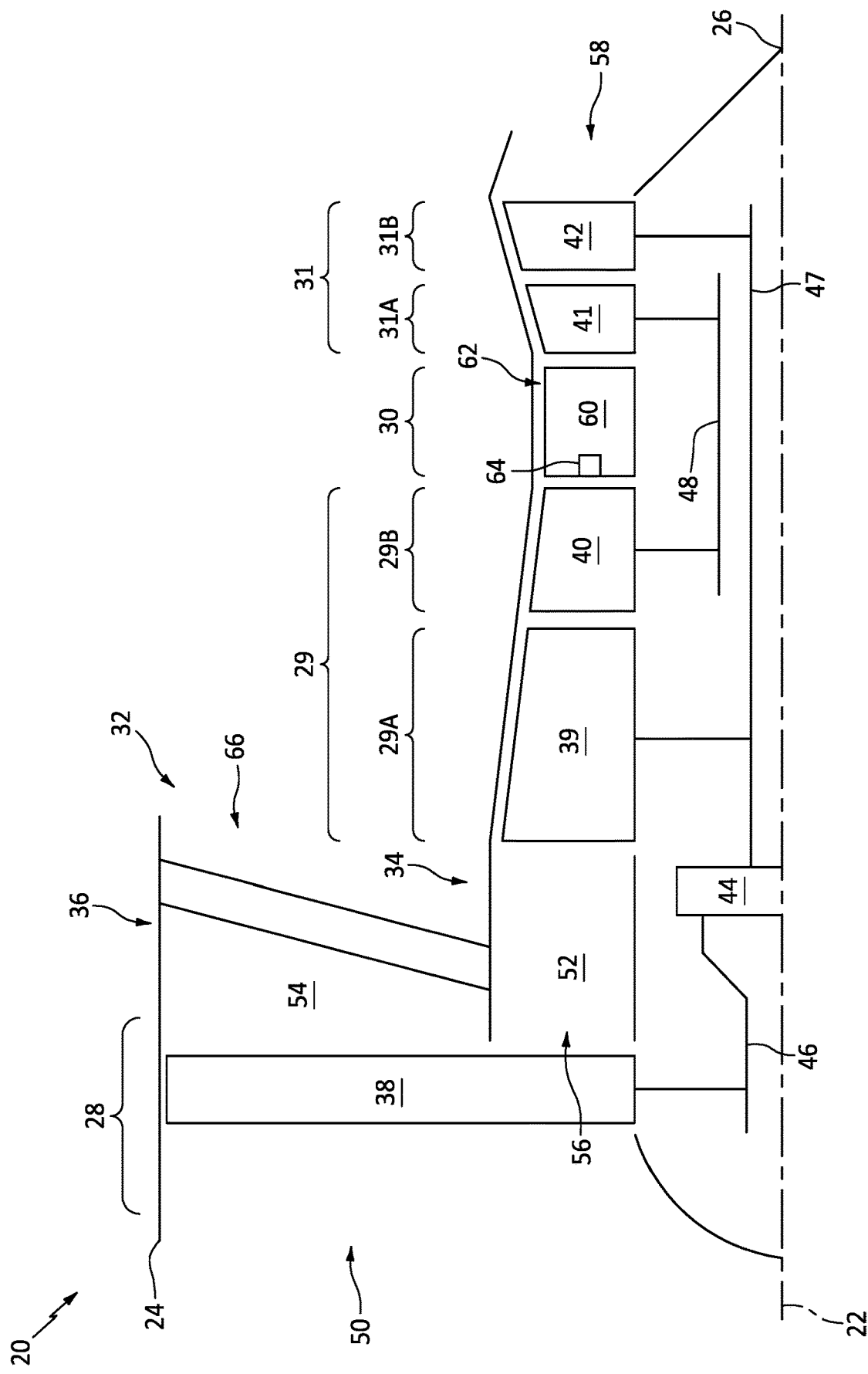
FIG. 1 is a partial schematic illustration of a gas turbine engine.

FIG. 1 is a side sectional illustration of a gas turbine engine 20 for an aircraft propulsion system. This turbine engine 20 extends axially along an axial centerline 22 between a forward, upstream end 24 and an aft, downstream end 26. The turbine engine 20 includes a fan section 28, a compressor section 29, a combustor section 30 and a turbine section 31. The compressor section 29 of FIG. 1 includes a low pressure compressor (LPC) section 29A and a high pressure compressor (HPC) section 29B. The turbine section 31 of FIG. 1 includes a high pressure turbine (HPT) section 31A and a low pressure turbine (LPT) section 31B.

The engine sections 28-31B of FIG. 1 are arranged sequentially along the axial centerline 22 within an engine housing 32. This engine housing 32 includes an inner case 34 (e.g., a core case) and an outer case 36 (e.g., a fan case). The inner case 34 may house one or more of the engine sections 29A-31B; e.g., a core of the turbine engine 20. The outer case 36 may house at least the fan section 28.

Each of the engine sections 28, 29A, 29B, 31A and 31B includes a respective bladed rotor 38-42. Each of these bladed rotors 38-42 includes a plurality of rotor blades arranged circumferentially around and connected to one or more respective rotor disks and/or hubs. The rotor blades, for example, may be formed integral with or mechanically fastened, welded, brazed, adhered and/or otherwise attached to the respective rotor disk(s) and/or the respective hub(s).

The fan rotor 38 is connected to a geartrain 44, for example, through a fan shaft 46. The geartrain 44 and the LPC rotor 39 are connected to and driven by the LPT rotor 42 through a low speed shaft 47. The HPC rotor 40 is connected to and driven by the HPT rotor 41 through a high speed shaft 48. The engine shafts 46-48 are rotatably supported by a plurality of bearings; e.g., rolling element and/or thrust bearings. Each of these bearings is connected to the engine housing 32 by at least one stationary structure such as, for example, an annular support strut.

During engine operation, air enters the turbine engine 20 through an airflow inlet 50 into the turbine engine 20. This air is directed through the fan section 28 and into a core flowpath 52 and a bypass flowpath 54. The core flowpath 52 extends sequentially through the engine sections 29A-31B (e.g., the engine core) from an inlet 56 into the core flowpath 52 to an exhaust 58 from the core flowpath 52. The air within the core flowpath 52 may be referred to as "core air". The bypass flowpath 54 extends through a bypass duct, and bypasses the engine core. The air within the bypass flowpath 54 may be referred to as "bypass air".

The core air is compressed by the LPC rotor 39 and the HPC rotor 40 and directed into a (e.g., annular) combustion chamber 60 of a (e.g., annular) combustor 62 in the combustor section 30. Fuel is injected by one or more fuel injector assemblies 64 (one visible in FIG. 1) into the combustion chamber 60 and mixed with the compressed core air to provide a fuel-air mixture. This fuel-air mixture is ignited and combustion products thereof flow through and sequentially cause the HPT rotor 41 and the LPT rotor 42 to rotate before being directed out of the turbine engine 20 through the core exhaust 58. The rotation of the HPT rotor 41 and the LPT rotor 42 respectively drive rotation of the HPC rotor 40 and the LPC rotor 39 and, thus, compression of the air received from the core inlet 56. The rotation of the LPT rotor 42 also drives rotation of the fan rotor 38, which propels the bypass air through the bypass flowpath 54 and out of the turbine engine 20 through an exhaust 66 from the bypass flowpath 54. The propulsion of the bypass air may account for a majority of thrust generated by the turbine engine 20.

Figure 2:
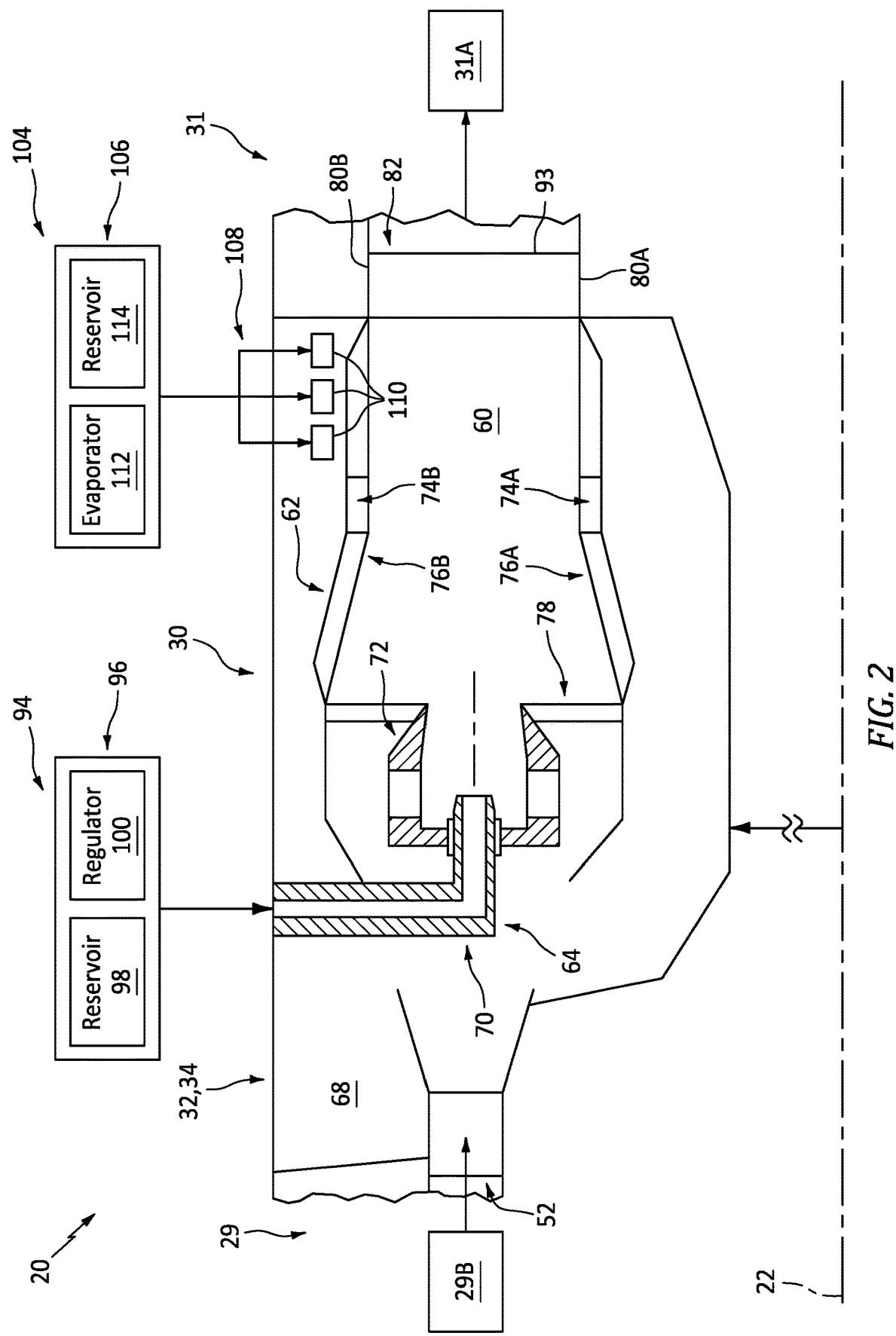
FIG. 2 is a partial schematic illustration of a combustor section between a compressor section and a turbine section.

FIG. 2 illustrate a portion of the combustor section 30 along the core flowpath 52 between the HPC section 29B and the HPT section 31A. This combustor section 30 includes the combustor 62, a diffuser plenum 68 and the one or more injector assemblies 64 (one visible in FIG. 2). Briefly, the combustor 62 is disposed within (e.g., surrounded by) the diffuser plenum 68—a compressed air plenum. This diffuser plenum 68 is formed by and/or within the engine housing 32 and its inner case 34. The diffuser plenum 68 receives the compressed core air from the HPC section 29B for subsequent provision into the combustion chamber 60. Each injector assembly 64 of FIG. 2 includes a fuel injector 70 mated with an air swirler structure 72. The fuel injector 70 injects the fuel into the combustion chamber 60. The air swirler structure 72 directs some of the core air from the diffuser plenum 68 into the combustion chamber 60 in a manner that facilitates mixing the core air with the injected fuel. One or more igniters (not shown) ignite the fuel-air mixture within the combustion chamber 60. One or more quench apertures 74A, 74B (generally referred to as "74") (e.g., dilution holes) in each wall 76A, 76B (generally referred to as "76") of the combustor 62 direct additional core air from the diffuser plenum 68 into the combustion chamber 60 to facilitate substantially complete burnout of (e.g., make stoichiometrically lean) the combustion products; e.g., the ignited fuel-air mixture.

Figure 3:
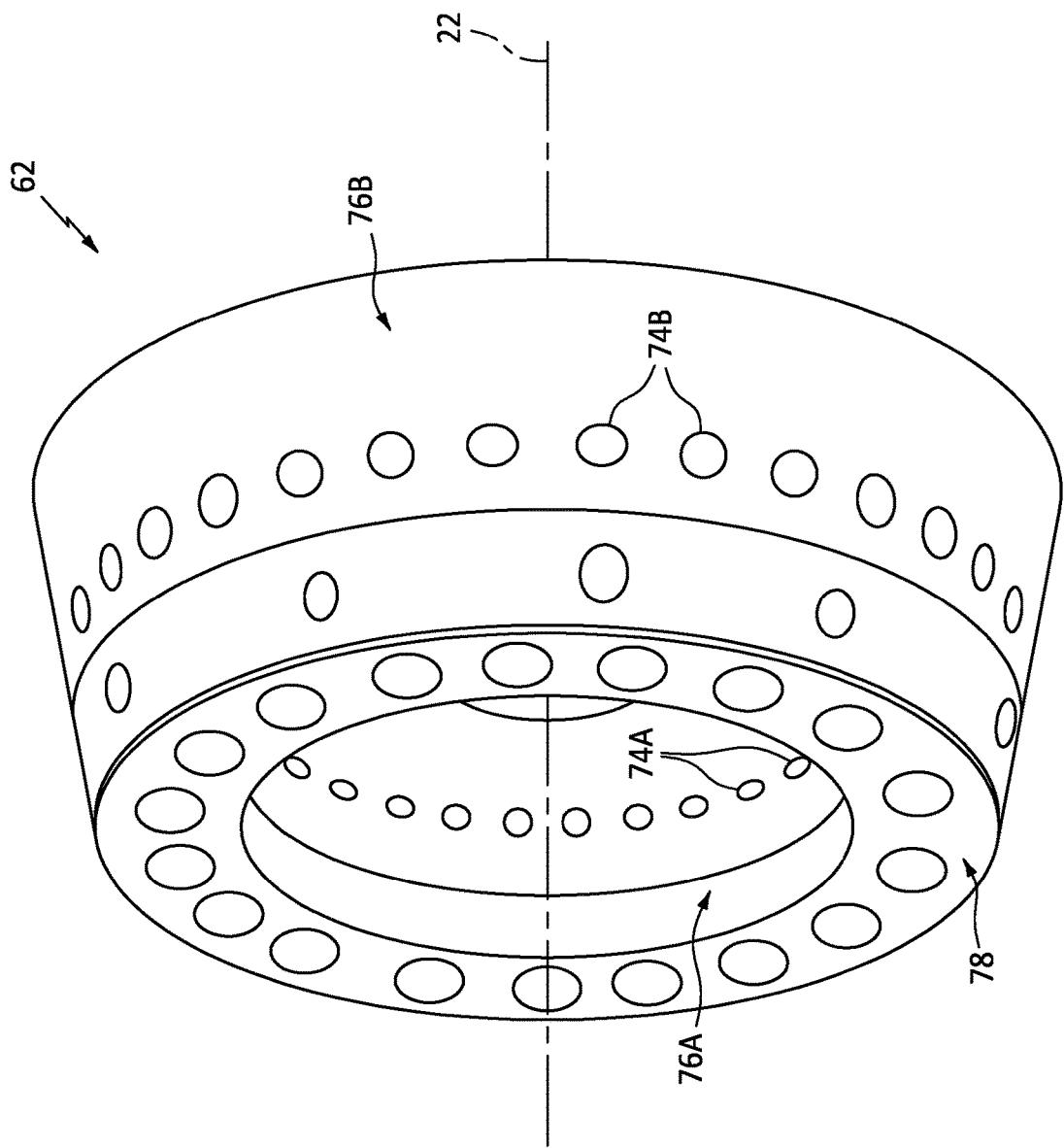
FIG. 3 is a perspective illustration of a combustor.

The combustor 62 may be configured as an annular combustor; e.g., an annular floating wall combustor. The combustor 62 of FIGS. 2 and 3, for example, includes an annular combustor bulkhead wall 78 ("bulkhead"), the tubular inner combustor wall 76A ("inner wall"), and the tubular outer combustor wall 76B ("outer wall"). The bulkhead 78 of FIG. 2 extends radially between and to the inner wall 76A and the outer wall 76B. The bulkhead 78 may be connected (e.g., mechanically fastened or otherwise attached) to the inner wall 76A and/or the outer wall 76B. Each combustor wall 76 projects axially along the axial centerline 22 out from the bulkhead 78 towards the HPT section 31A. The inner wall 76A of FIG. 2, for example, projects axially to and may be connected to an (e.g., tubular) inner platform 80A of a downstream stator vane array 82 in the HPT section 31A. The outer wall 76B of FIG. 2 projects axially to and may be connected to an (e.g., tubular) outer platform 80B of the downstream stator vane array 82. With the arrangement of FIG. 2, the combustion chamber 60 is formed by and extends radially within the combustor 62 between and to the inner wall 76A and the outer wall 76B. The combustion chamber 60 is formed by and extends axially (in an upstream direction along the core flowpath 52) into the combustor 62 from the stator vane array 82 to the bulkhead 78. The combustion chamber 60 also extends within the combustor 62 circumferentially about (e.g., completely around) the axial centerline 22, which may configure the combustion chamber 60 as a full-hoop annulus.

Figure 4:
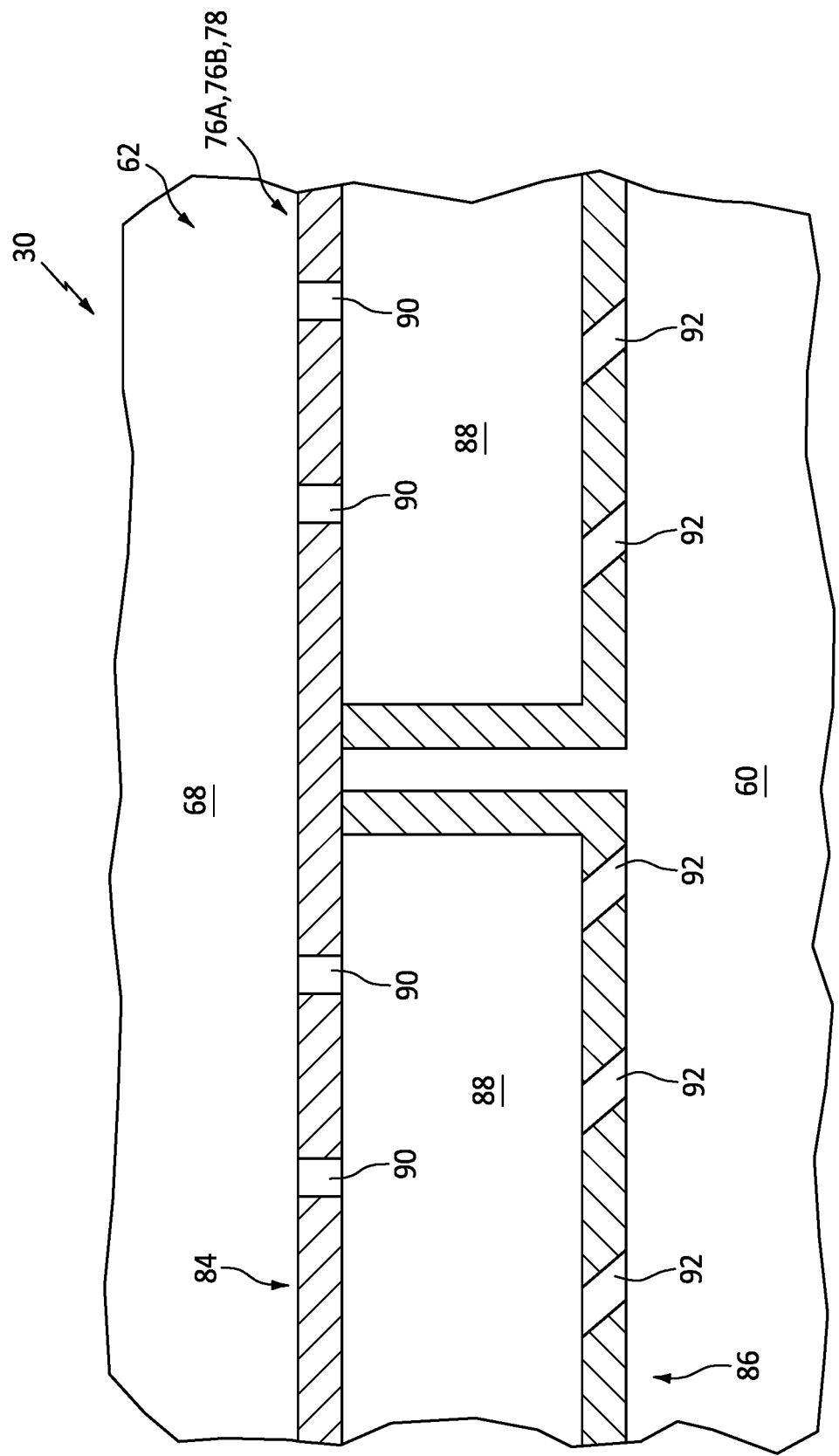
FIG. 4 is a partial sectional illustration of a combustor wall.

Referring to FIG. 4, any one or more or all of the walls 76A, 76B, 78 may each be configured as a multi-walled structure; e.g., a hollow, dual-walled structure. Each wall 76A, 76B, 78 of FIG. 4, for example, includes a combustor wall shell 84, a combustor wall heat shield 86 (e.g., a liner) and one or more combustor wall cooling cavities 88 (e.g., impingement cavities) formed by and (e.g., radially and/or axially) between the shell 84 and the heat shield 86. Each cooling cavity 88 of FIG. 4 is fluidly coupled with the diffuser plenum 68 through one or more cooling apertures 90 in the shell 84; e.g., impingement apertures. Each cooling cavity 88 of FIG. 4 is fluidly coupled with the combustion chamber 60 through one or more cooling apertures 92 in the heat shield 86; e.g., effusion apertures. Of course, various other multi-walled combustor wall structures are known in the art, and the present disclosure is not limited to any particular ones thereof. Furthermore, it is contemplated any one or more or all of the walls 76A, 76B and/or 78 of FIG. 2 may each alternatively be configured as a single-walled structure. The shell 84 of FIG. 4, for example, may be omitted and the heat shield 86 may form a single walled liner/wall. However, for ease of description, each wall 76A, 76B, 78 may each be described below as the hollow, dual-walled structure.

Referring to FIG. 2, the stator vane array 82 includes the inner platform 80A, the outer platform 80B and a plurality of stator vanes 93 (one visible in FIG. 2). The stator vanes 93 are arranged circumferentially about the axial centerline 22 in an array; e.g., a circular array. Each of these stator vanes 93 extends radially across the core flowpath 52 between and to the inner platform 80A and the outer platform 80B. Each of the stator vanes 93 may also be connected to the inner platform 80A and/or the outer platform 80B. The stator vane array 82 and its stator vanes 93 are configured to turn and/or otherwise condition the combustion products exiting the combustion chamber 60 for interaction with a first stage of the HPT rotor 41 (see FIG. 1).

Figure 5:
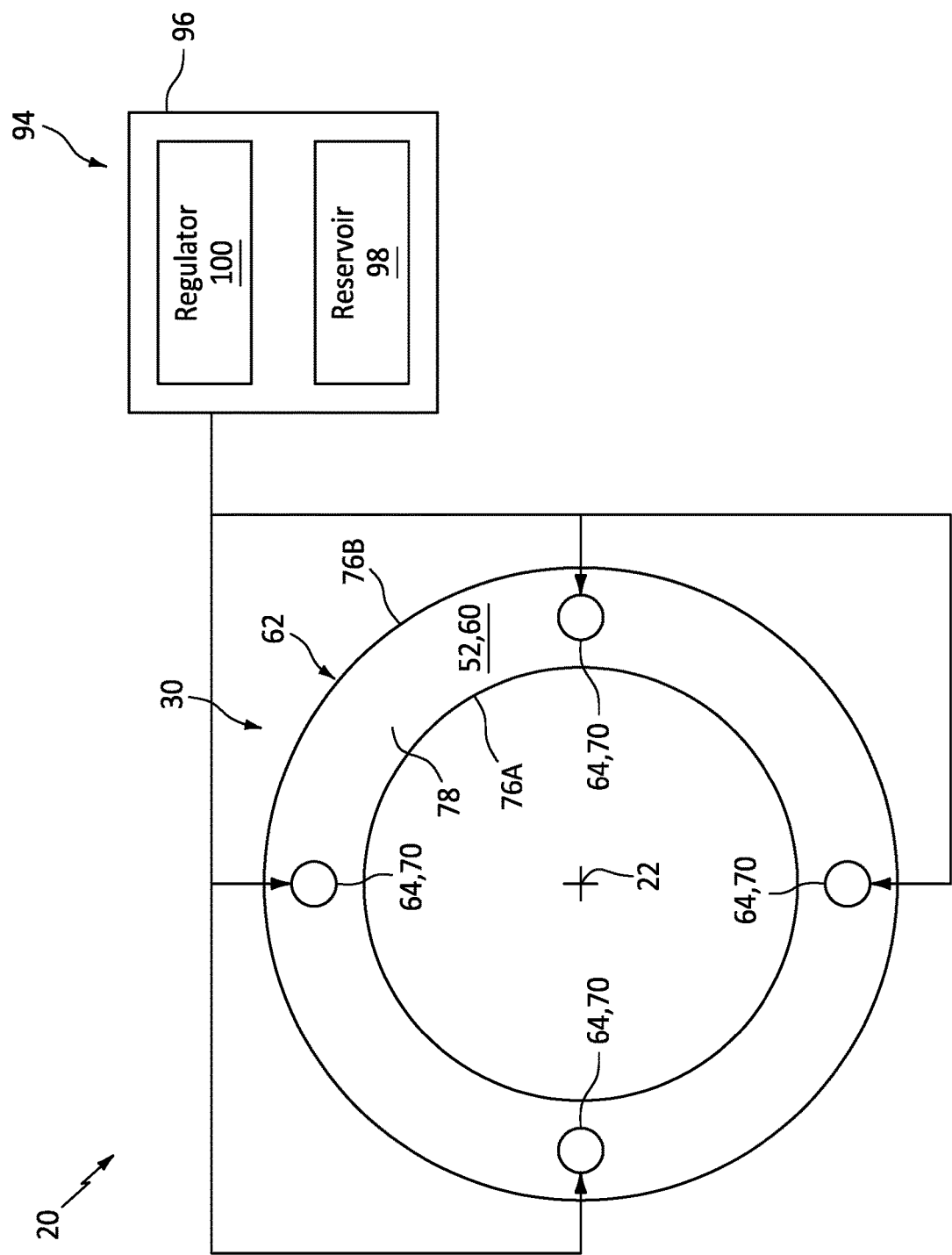
FIG. 5 is a schematic illustration of a fuel system configured with the combustor section.

Referring to FIG. 5, the turbine engine 20 includes a fuel system 94 for delivering the fuel to the combustor 62. This fuel system 94 includes a fuel source 96 and the one or more fuel injectors 70. The fuel source 96 of FIG. 5 includes a fuel reservoir 98 and/or a fuel flow regulator 100; e.g., a valve and/or a pump. The fuel reservoir 98 is configured to store the fuel before, during and/or after turbine engine operation. The fuel reservoir 98, for example, may be configured as or otherwise include a tank, a cylinder, a pressure vessel, a bladder or any other type of fuel storage container. The fuel flow regulator 100 is configured to direct and/or meter a flow of the fuel from the fuel reservoir 98 to one or more or all of the fuel injectors 70. The fuel injectors 70 may be arranged circumferentially about the axial centerline 22 in an array. Each fuel injector 70 is configured to direct the fuel received from the fuel source 96 into the combustion chamber 60 for combustion.

The fuel delivered by the fuel system 94 may be a non-hydrocarbon fuel; e.g., a hydrocarbon free fuel. Examples of the non-hydrocarbon fuel include, but are not limited to, hydrogen fuel (e.g., hydrogen ($H_2$) gas) and ammonia fuel (e.g., ammonia ($NH_3$) gas). The turbine engine 20 of FIG. 1 may thereby be configured as a non-hydrocarbon turbine engine; e.g., a hydrocarbon free turbine engine. The present disclosure, however, is not limited to non-hydrocarbon turbine engines. The fuel delivered by the fuel system 94, for example, may alternatively be a hydrocarbon fuel such as, but not limited to, kerosene or jet fuel. The turbine engine 20 of FIG. 1 may thereby be configured as a hydrocarbon turbine engine. Alternatively, the fuel system 94 may be configured as a multi-fuel system operable to deliver, individually or in combination, multiple different fuels (e.g., a non-hydrocarbon fuel and a hydrocarbon fuel, etc.) for combustion within the combustion chamber 60. The turbine engine 20 of FIG. 1 may thereby be configured as a multi-fuel turbine engine; e.g., a dual-fuel turbine engine. However, for ease of description, the fuel delivered by the fuel system 94 may be described below as the non-hydrocarbon fuel; e.g., the hydrogen fuel.

Referring to FIG. 2, the combustor 62 and its walls 76A, 76B and 78 are subject to relatively hot combustion products within the combustion chamber 60 during turbine engine operation. To cool the combustor 62 and its walls 76A, 76B and 78, a backside of each wall 76A, 76B, 78 of FIG. 2 is exposed to the core air flowing within the diffuser plenum 68. As the core air flows within the diffuser plenum 68 and along at least a portion or an entirety of the backside of each wall 76A, 76B, 78, the core air may convectively air cool the respective wall 76A, 76B, 78. To enhance this air cooling of the combustor 62, some of the core air may also be directed across one or more or all of the walls 76A, 76B and/or 78 from the diffuser plenum 68 into the combustion chamber 60 through cooling apertures of and/or cooling cavities within the respective wall(s) 76A, 76B and/or 78. For example, referring to FIG. 4, the cooling apertures 90 may direct some of the core air from the diffuser plenum 68 into a respective cooling cavity 88 to impinge against a cooling cavity side of the heat shield 86. The core air may thereby impingement cool the heat shield 86. The cooling apertures 92 may subsequently direct at least some or all of the core air from within the respective cooling cavity 88 into the combustion chamber 60 to provide (e.g., form) an air film or films along a combustion chamber side of the heat shield 86. The core air may thereby film cool the heat shield 86 and/or provide an air buffer or buffers between the heat shield 86 and the relatively hot combustion products within the combustion chamber 60.

Combustion product temperatures may continue to increase in an effort to improve turbine engine efficiency and/or facilitate improved turbine engine performance, particularly when using alternative fuels such as hydrogen fuel or the like. However, utilizing additional core air from the core flowpath 52 and its diffuser plenum 68 to provide additional combustor air cooling may be counterproductive since that core air is no longer available (at least primarily) for the combustion process. Therefore, referring to FIG. 6, the turbine engine 20 also includes a steam system 104 to provide steam cooling for the combustor 62 and at least one of its walls such as the outer wall 76B. This steam system 104 includes a steam source 106, a steam delivery circuit 108 and one or more steam injectors 110.

The steam source 106 is configured to provide the steam to the steam delivery circuit 108 during turbine engine operation and, more particularly, during steam system operation. The steam source 106, for example, may be configured as or otherwise include an evaporator 112, which may be or otherwise include a fluid-to-fluid heat exchanger and/or an electrical heater. The evaporator 112 is configured to evaporate water into the steam during steam system operation. The water may be received from various sources. The steam source 106 of FIG. 6, for example, includes a water reservoir 114 fluidly coupled with and upstream of the evaporator 112. This water reservoir 114 is configured to store the water before, during and/or after turbine engine operation. Examples of the water reservoir 114 include, but are not limited to, a tank, a cylinder, a pressure vessel, a bladder or any other type of water storage container. Briefly, the water may be supplied to the water reservoir 114 by recovering water vapor from the combustion products flowing through the core flowpath 52 (see FIG. 1) and/or from another water source onboard or offboard an aircraft.

Figure 6:
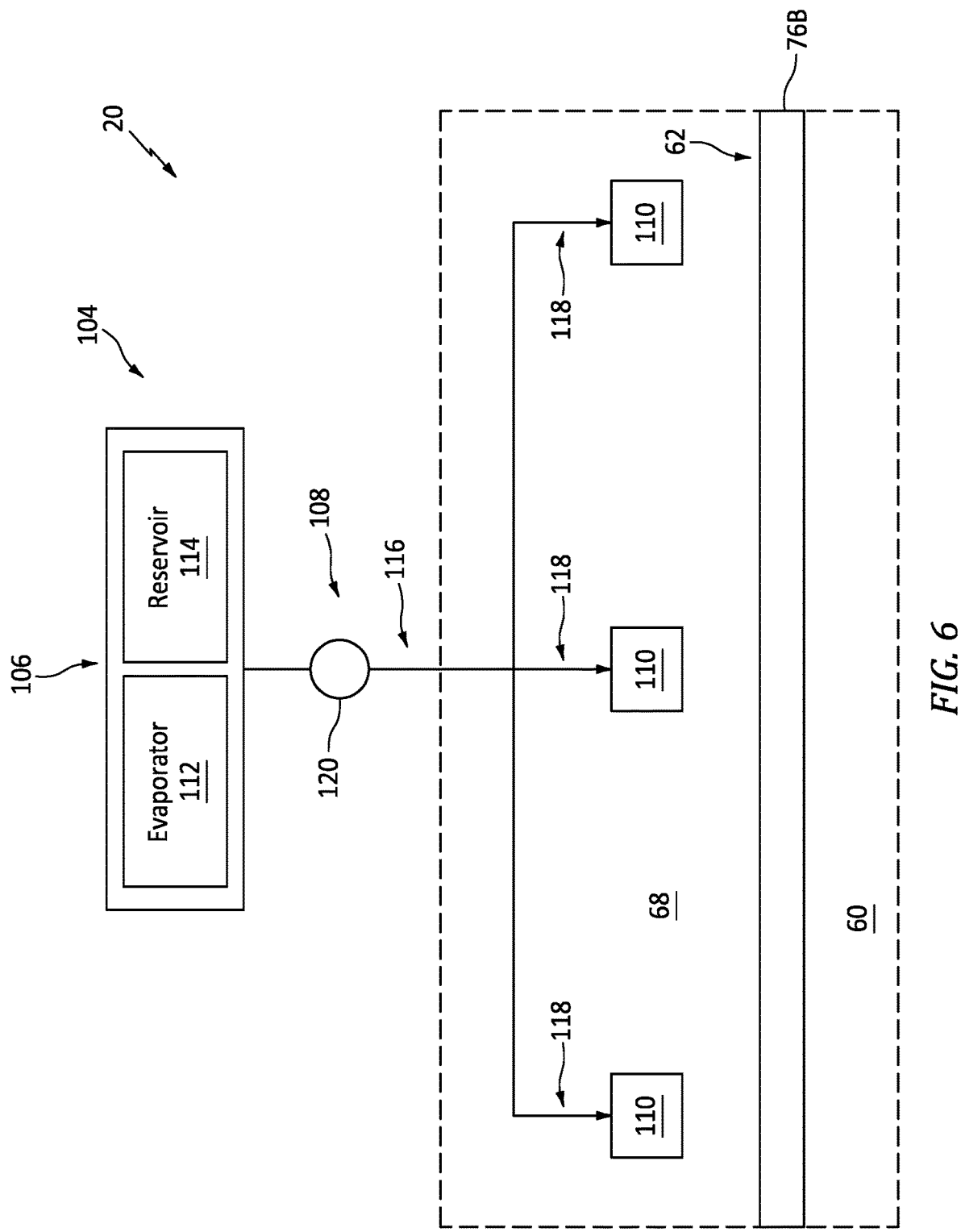
FIG. 6 is a schematic illustration of a steam system arranged with the combustor.

The steam delivery circuit 108 of FIG. 6 includes a supply circuit 116 and one or more feed circuits 118, where each feed circuit 118 is associated with a respective one of the steam injectors 110. The supply circuit 116 of FIG. 6 extends from an outlet from the steam source 106 to an interface with the feed circuits 118 such as a manifold. At the interface, the feed circuits 118 may be fluidly coupled in parallel to and downstream of the supply circuit 116. Each of the feed circuits 118 extends from the interface to an inlet of a respective one of the steam injectors 110. The steam delivery circuit 108 thereby fluidly couples the steam source 106 to the respective steam injectors 110.

The steam directed through the steam delivery circuit 108 may be regulated based on cooling needs for the combustor 62 and its combustor wall 76B and/or based on a mode of turbine engine operation. The steam delivery circuit 108 of FIG. 6, for example, includes a steam flow regulator 120. The steam flow regulator 120 is arranged (e.g., fluidly coupled inline) with the supply circuit 116. The steam flow regulator 120 is configured to selectively direct and/or meter a flow of the steam from the steam source 106 to the steam injectors 110. For example, the steam flow regulator 120 may be configured as or otherwise include a control valve. This control valve may fully open, may fully close and/or may move to one or more partially open positions. While the steam flow regulator 120 is illustrated in FIG. 6 as being part of the supply circuit 116, that steam flow regulator 120 may alternatively be arranged at the interface between the supply circuit 116 and the feed circuits 118, at an inlet to the supply circuit 116, or otherwise. One or more or all of the feed circuits 118 may also or alternatively be provided with its own steam flow regulator. Furthermore, it is contemplated the steam delivered to one or more or all of the steam injectors 110 may still also or alternatively be regulated by adjusting an amount of steam provided (e.g., produced) by the steam source 106.

Referring to FIG. 2, each of the steam injectors 110 is arranged within the diffuser plenum 68 next to the combustor 62 and the respective combustor wall 76B. Each steam injector 110 of FIG. 2, for example, is located radially between the engine housing 32 and the combustor 62. Each steam injector 110 is spaced radially inward from the engine housing 32 and its inner case 34. Each steam injector 110 is spaced radially outward from the combustor 62 and its respective combustor wall 76B. The steam injectors 110 are arranged axially along the combustor 62 and its respective combustor wall 76B. While the steam injectors 110 of FIG. 2 are equispaced axially along the respective combustor wall 76B and the axial centerline 22, the present disclosure is not limited to such an equispaced arrangement and may alternatively be asymmetrically spaced, for example, to target potential hot spots, etc.

One or more or all of the steam injectors 110 may be disposed along a downstream portion of the combustor 62 and its respective combustor wall 76B. One or more or all of the steam injectors 110, for example, may be arranged axially between the respective array of the quench apertures 74B and the downstream end of the combustor 62 and its respective combustor wall 76B at the stator vane array 82. Each steam injector 110 of FIG. 2 is thereby axially offset from the respective array of the quench apertures 74B. However, it is contemplated one or more or all of the steam injectors 110 (or additional steam injectors) may also or alternatively be arranged axially between the respective array of the quench apertures 74B and the bulkhead 78. It is also contemplated at least one of the steam injectors 110 (or an additional steam injector) may also or alternatively be axially aligned with the respective array of the quench apertures 74B. In general, however, the steam injector(s) 110 should not (at least significantly) obstruct the flow of the core air to the respective array of the quench apertures 74B and/or the flow of the core air for the air cooling.

Figure 7:
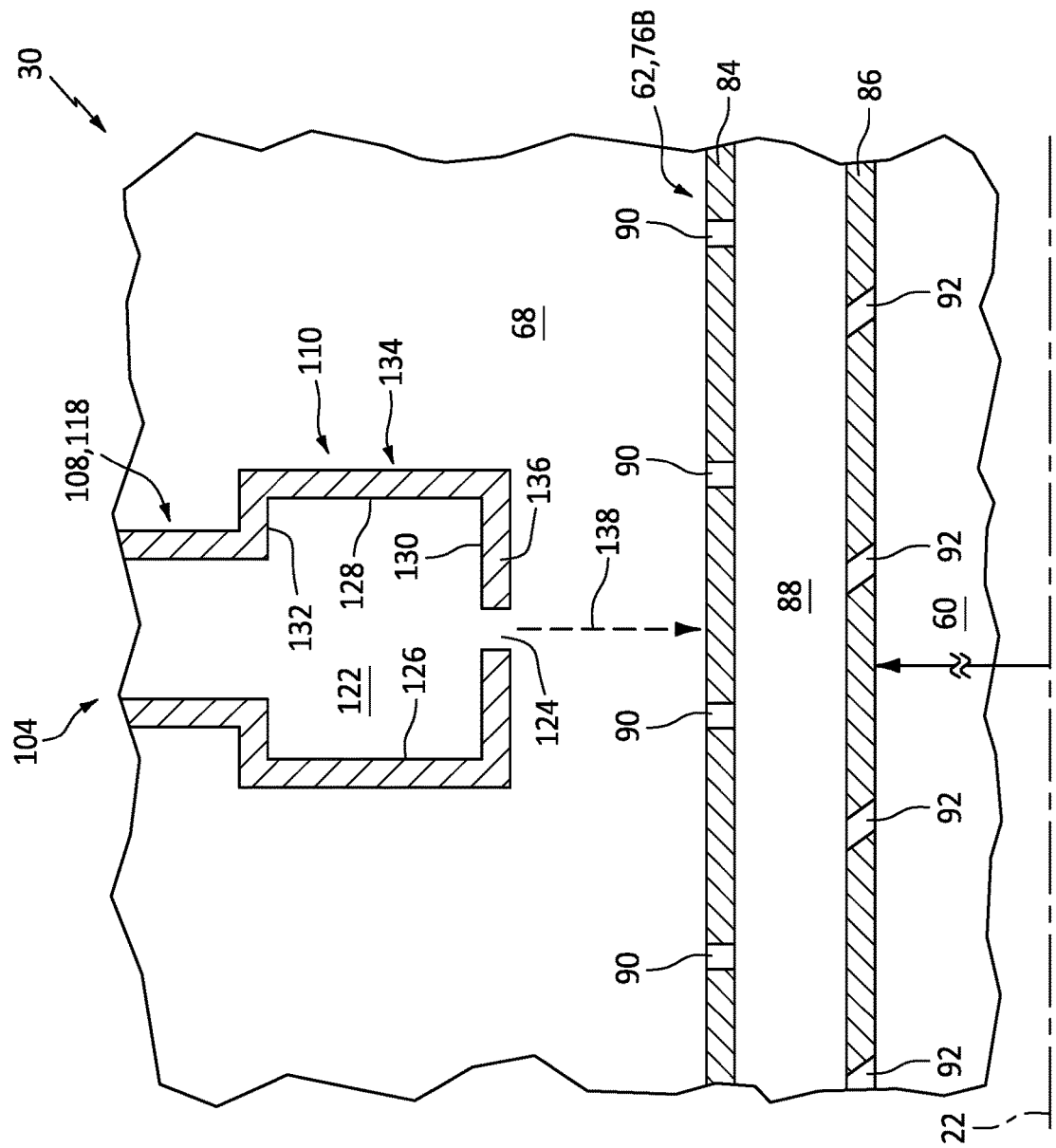
FIG. 7 is a sectional illustration of a portion of the steam system with the combustor.
Figure 8:
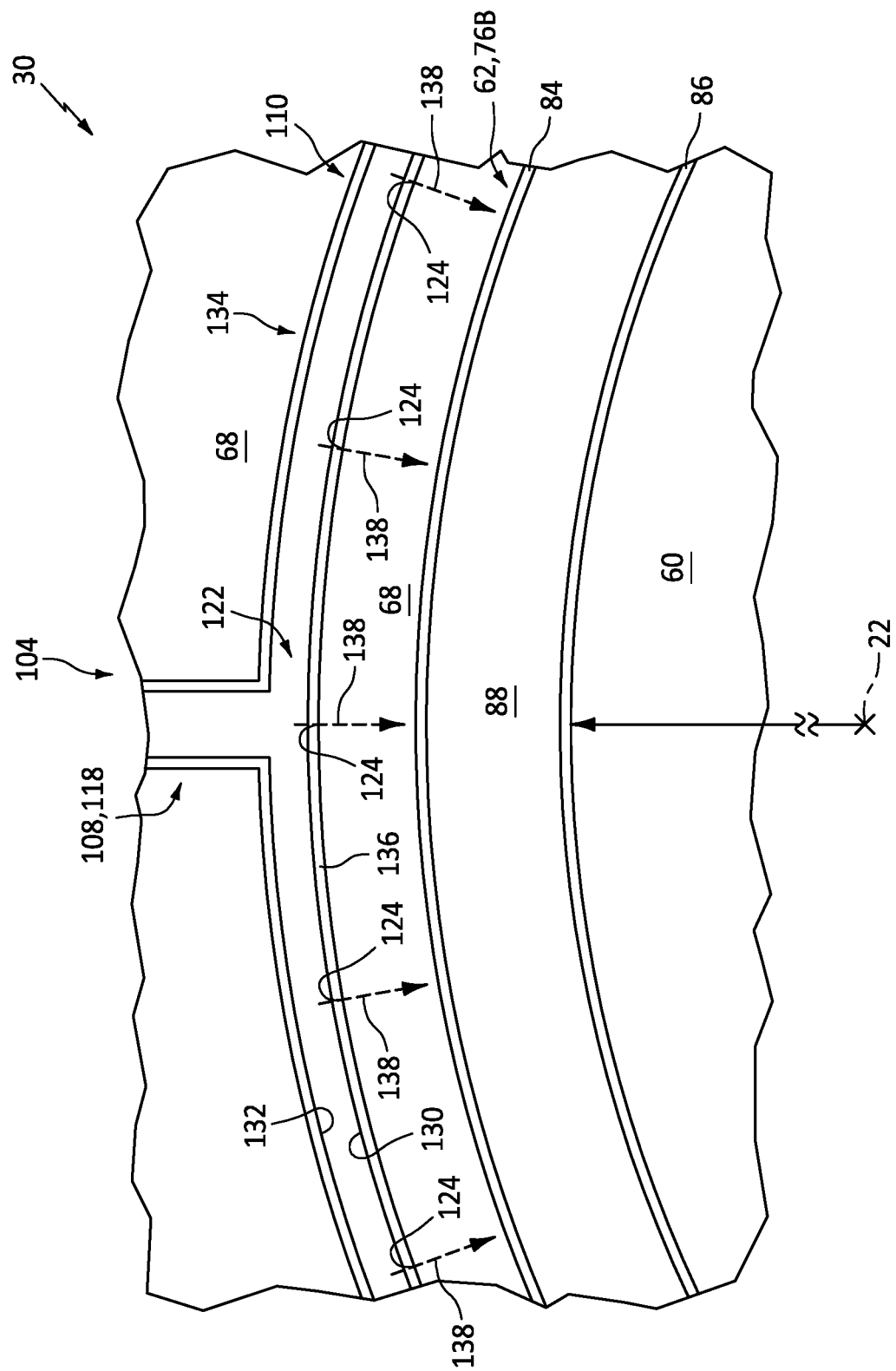
FIG. 8 is another sectional illustration of a portion of the steam system with the combustor.

Referring to FIGS. 7 and 8, each steam injector 110 may be configured as a steam rail injector; e.g., a steam ring injector. The steam injector 110 of FIG. 8, for example, extends circumferentially about (e.g., completely around) the combustor 62 and its respective combustor wall 76B. The steam injector 110 may thereby circumscribe the combustor 62 and its respective combustor wall 76B. The steam injector 110 of FIGS. 7 and 8 includes an internal steam passage 122 and one or more steam outlets 124.

Referring to FIG. 7, the steam passage 122 extends within the respective steam injector 110 axially between opposing axial ends 126 and 128 of the steam passage 122. The steam passage 122 extends within the respective steam injector 110 radially between opposing radial sides 130 and 132 of the steam passage 122. Referring to FIG. 8, the steam passage 122 extends within the respective steam injectors 110 circumferentially about (e.g., completely around) the centerline axis 22. The steam passage 122 may thereby be formed as an annulus within a body 134 of the steam injector 110. This steam passage 122 is also fluidly coupled with and radially between the respective feed circuit 118 and the steam outlets 124. The steam passage 122 may thereby form a manifold for distributing steam received from the respective feed circuit 118 to the steam outlets 124.

The steam outlets 124 are arranged circumferentially about (e.g., completely around) the respective combustor wall 76B and the axial centerline 22 in an array; e.g., a circular array. While the steam outlets 124 of FIG. 8 are equispaced circumferentially about the respective combustor wall 76B and the axial centerline 22, the present disclosure is not limited to such an equispaced arrangement and may alternatively be asymmetrically spaced or spaced in another pattern, for example, to target potential hot spots, etc. Each of the steam outlets 124 projects (e.g., radially inward) from the steam passage 122, through a sidewall 136 of the steam injector body 134, to the diffuser plenum 68. The steam outlets 124 thereby fluidly couple the steam passage 122 to the diffuser plenum 68.

During steam system operation, each steam injector 110 receives steam from the steam source 106 (see FIG. 6) through the steam delivery circuit 108. At each steam injector 110, the steam is distributed to from the steam passage 122 to the steam outlets 124 and directed out of the steam injector 110 into the diffuser plenum 68 and towards the respective combustor wall 76B. The steam injector 110 of FIGS. 7 and 8, for example, may direct a flow (e.g., a jet) of the steam out from each steam outlet 124 and into the diffuser plenum 68 along a respective trajectory 138 to impinge against the backside of the respective combustor wall 76B. Each steam injector 110 may thereby impingement cool the combustor 62 and its respective combustor wall 76B with the steam, which impingement steam cooling may enhance the air cooling of the respective combustor wall 76B described above. The steam may then mix with the core air and flow across the respective combustor wall 76B with the cooling core air; e.g., through the cooling apertures 90, 92 and/or cooling cavities 88.

Figure 9B:
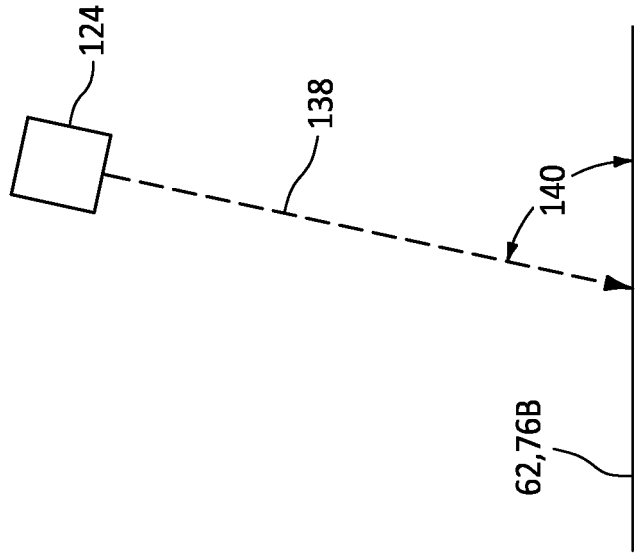
FIGS. 9A and 9B are schematic illustrations of various steam trajectories.
Figure 9A:
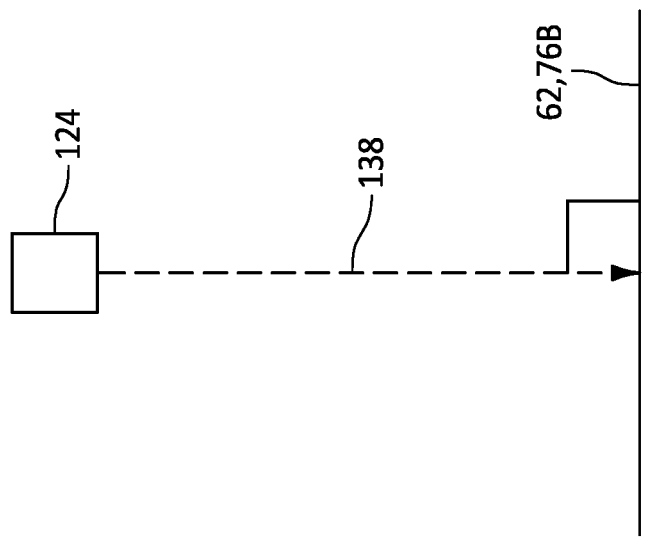

In some embodiments, referring to FIG. 9A, the trajectory 138 of the steam flow exhausted from one, some or all of the steam outlets 124 may be perpendicular to the backside of the respective combustor wall 76B at or about, for example, a point or an area where the respective steam flow impinges against the respective combustor wall 76B. In other embodiments, referring to FIG. 9B, the trajectory 138 of the steam flow exhausted from one, some or all of the steam outlets 124 may be angularly offset from the backside of the respective combustor wall 76B at or about, for example, the impingement point or area by an acute angle 140. This acute angle 140 may be greater than forty-five degrees (45°); e.g., equal to or greater than sixty degrees (60°), seventy degrees (70°) or eighty degrees (80°).

Figure 10:
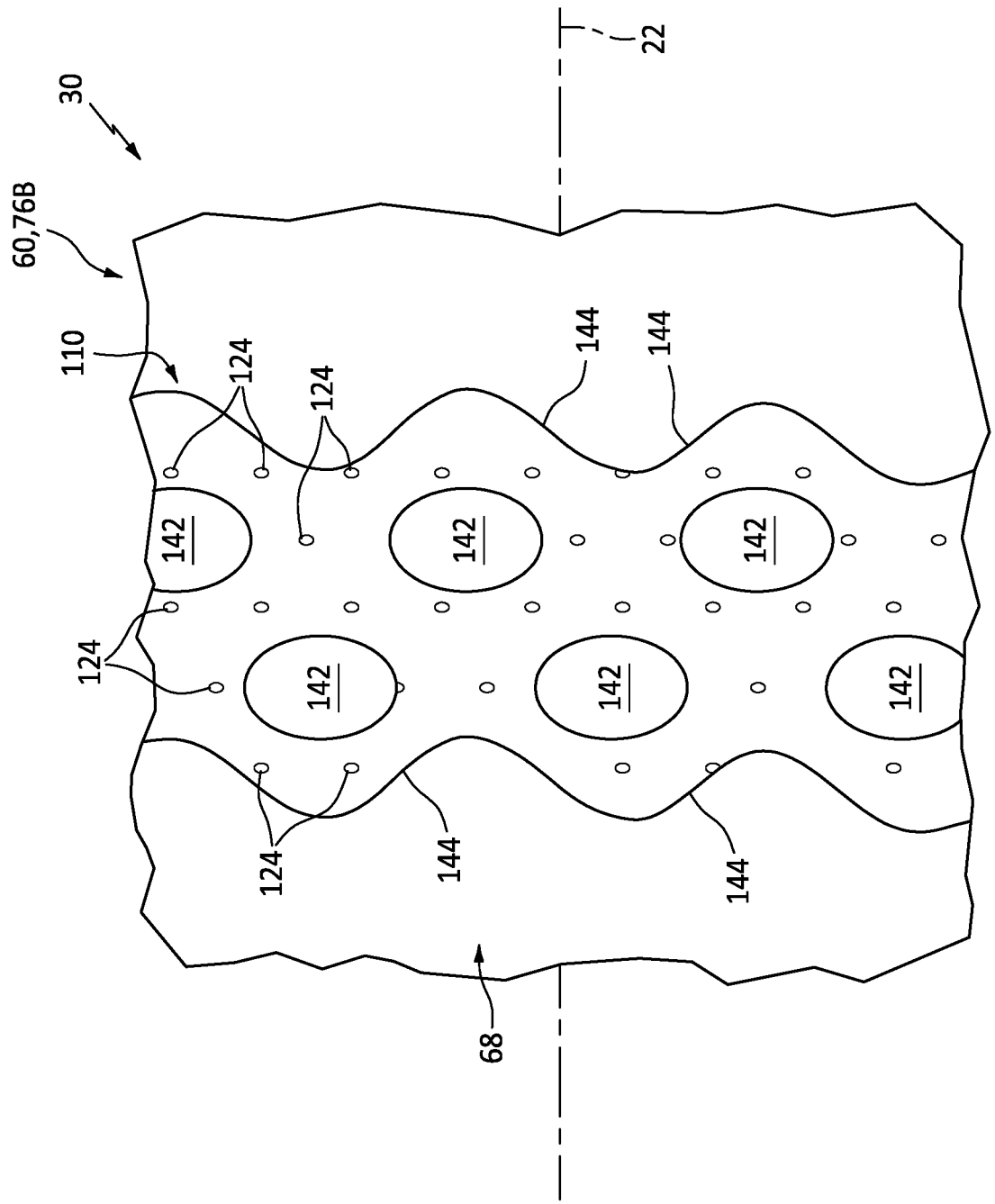
FIG. 10 is a schematic illustration of a portion of another steam injector with the combustor.

Each steam injector 110 is described above as the steam rail (e.g., ring) injector. The present disclosure, however, is not limited to such an exemplary steam injector configuration. For example, referring to FIG. 10, each steam injector 110 may alternatively be configured as a steam blanket injector. Like the steam rail injector described above, the steam injector 110 of FIG. 10 may extend circumferentially about (e.g., completely around) the combustor 62 and its respective combustor wall 76B. The steam injector 110 of FIG. 10, however, also extends axially along the combustor 62 and its respective combustor wall 76B for an extended length. With this configuration, the steam outlets 124 may be arranged into a plurality of outlet sets/groups axially along the combustor 62 and its respective combustor wall 76B. The steam outlets 124 in each outlet set are arranged circumferentially about (e.g., completely around) the respective combustor wall 76B and the axial centerline 22 in an array; e.g., a circular array. Thus, the steam outlets 124 of FIG. 10 are arranged both circumferentially about and axially along the respective combustor wall 76B. The steam injector 110 of FIG. 10 may thereby blanket a relatively large area of the respective combustor wall 76B with the steam for cooling.

To reduce an airflow obstruction to the respective combustor wall 76B, the steam injector 110 may be configured with a lattice configuration. The steam injector 110 of FIG. 10, for example, includes one or more ports 142 formed by a network of interconnected conduits 144. Each of the ports 142 extends (e.g., radially) through the steam injector 110 and thereby provides a path for the core air flowing within the diffuser plenum 68 to pass. With this arrangement, the core air may flow across the steam injector 110 to those areas generally covered by and/or targeted by the steam injector 110 for steam cooling.

In some embodiments, referring to FIG. 11A, each steam injector 110 may have an annular body that circumscribes the combustor 62 and its respective combustor wall 76B (see FIG. 2). In other embodiments, referring to FIGS. 11B and 11C, such an annular body may be broken up into multiple arcuate sections, where each arcuate section may be configured as a discrete one of the steam injectors 110. For example, at least some or all of the steam injectors 110 of FIGS. 11B and 11C may be arranged circumferentially about the axial centerline 22 in an array. Referring to FIG. 11B, each of the steam injectors 110 may extend partially circumferentially about the axial centerline 22. Alternatively, referring to FIG. 11C, each steam injector 110 any be configure as a discrete unit similar to the fuel injectors 70 of FIGS. 2 and 4.

Figure 12:
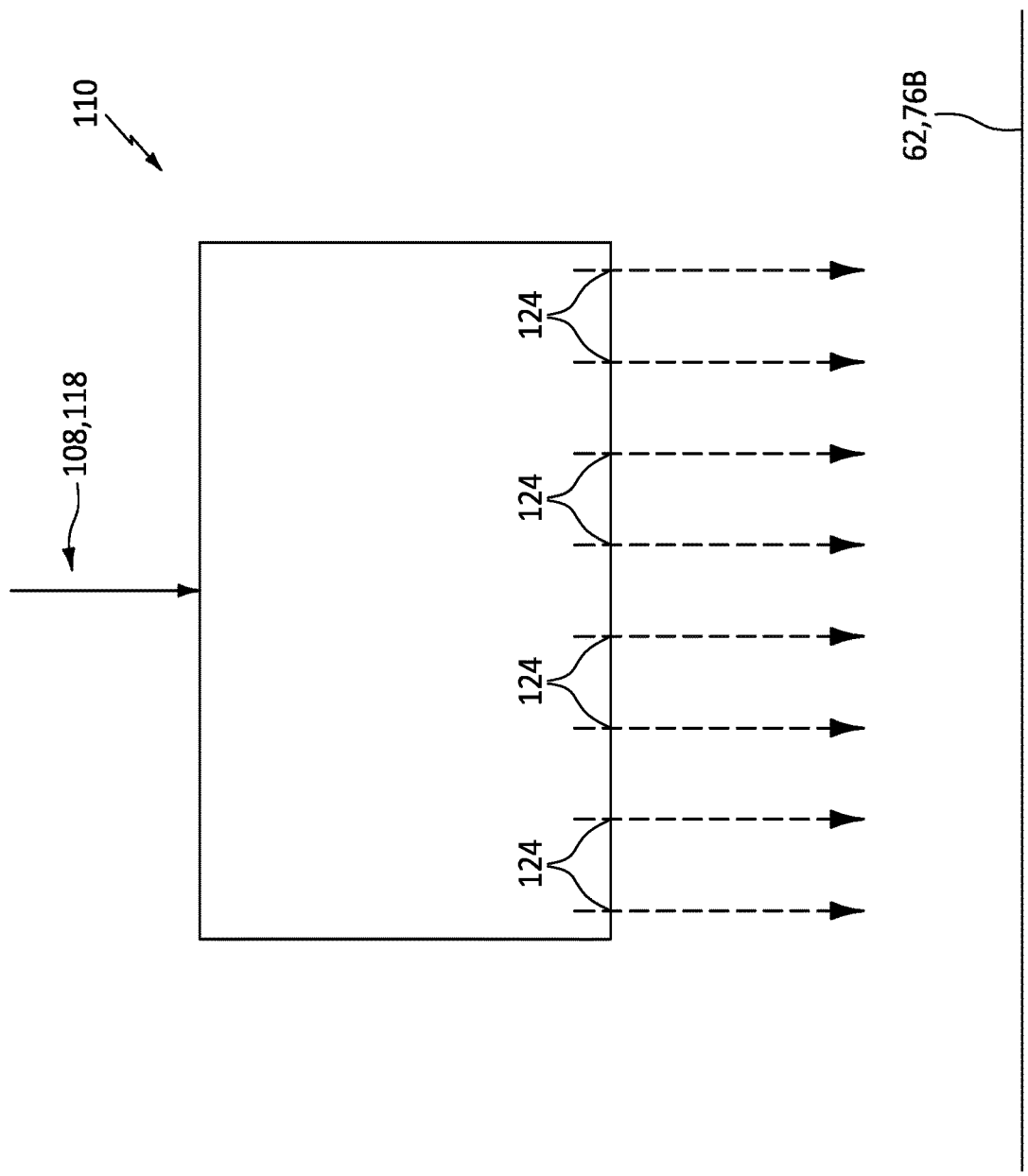
FIG. 12 is a schematic illustration of another steam injector with the combustor.

In some embodiments, referring to FIG. 12, one or more or all of the steam injectors 110 may each be configured as a steam showerhead injector. The steam outlets 124 in the steam injector 110 of FIG. 12, for example, may be grouped together to blanket a region of the respective combustor wall 76B with the steam for cooling.

The steam system 104 of FIG. 6 may be operated in various modes. For example, when turbine engine 20 is operating at low throttle or idle (e.g., during engine warmup, engine cooldown or for aircraft descent), the steam delivery circuit 108 may direct little or no steam to one or more or all of the steam injectors 110. The combustor 62 may therefore (e.g., only or substantially) be cooled using cooling air; e.g., the core air from the diffuser plenum 68. However, when the turbine engine 20 is operating at medium throttle or high throttle (e.g., for aircraft cruise or aircraft takeoff), the steam delivery circuit 108 may direct the steam to one or more or all of the steam injectors 110. The steam may thereby bolster the air cooling of the combustor 62 while also targeting the additional cooling to select areas. With this operability, the steam system 104 may provide additional cooling capability using the steam, but regularly provide the air cooling throughout the engine cycle. Note, providing air cooling may be particularly useful at turbine engine startup where, for example, the steam may not be available until after the turbine engine 20 is warmed up.

The steam system 104 may be included in various turbine engines other than the one described above. The steam system 104, for example, may be included in a geared turbine engine where a geartrain connects one or more shafts to one or more rotors in a fan section, a compressor section and/or any other engine section. Alternatively, the steam system 104 may be included in a turbine engine configured without a geartrain; e.g., a direct drive turbine engine. The steam system 104 may be included in a geared or non-geared turbine engine configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
a housing comprising an air plenum;
an annular combustor disposed within the air plenum, the annular combustor including an annular combustion chamber and a combustor wall between the annular combustion chamber and the air plenum; and
a steam system comprising a steam injector arranged within the air plenum next to the combustor wall, the steam system configured to inject steam out of the steam injector and into the air plenum to impinge against the combustor wall, the steam injector configured as a steam blanket injector extending axially along and circumferentially about the combustor wall, and the steam blanket injector having a lattice configuration.

2. The assembly of claim 1, wherein
the steam system is configured to direct a flow of the steam out of the steam injector and into the air plenum along a trajectory to impinge against the combustor wall; and
the trajectory is perpendicular to the combustor wall.

3. The assembly of claim 1, wherein
the steam system is configured to direct a flow of the steam out of the steam injector and into the air plenum along a trajectory to impinge against the combustor wall; and
the trajectory is angularly offset from the combustor wall by an acute angle greater than forty-five degrees.

4. The assembly of claim 1, wherein the steam system is configured to direct
a first flow of the steam out of the steam injector and into the air plenum to impinge against a first area of the combustor wall; and
a second flow of the steam out of the steam injector and into the air plenum to impinge against a second area of the combustor wall.

5. The assembly of claim 1, wherein
the steam injector includes a plurality of steam outlets; and
the steam system is configured to direct the steam through the plurality of the steam outlets into the air plenum to impinge against the combustor wall.

6. The assembly of claim 5, wherein
the combustor wall extends axially along and circumferentially about a centerline; and
at least some of the plurality of steam outlets are arranged axially along the combustor wall.

7. The assembly of claim 5, wherein
the combustor wall extends axially along and circumferentially about a centerline; and
at least some of the plurality of steam outlets are arranged circumferentially about the combustor wall.

8. The assembly of claim 1, wherein the combustor wall comprises a plurality of cooling apertures configured to receive cooling air from the air plenum.

9. The assembly of claim 1, wherein
the combustor wall comprises an array of quench apertures; and
the steam injector is offset from the array of quench apertures.

10. The assembly of claim 1, further comprising:
a compressor section;
the air plenum fluidly coupled with and downstream of the compressor section.

11. An assembly for a turbine engine, comprising:
a combustor including a combustion chamber and a combustor wall forming a peripheral boundary of the combustion chamber, the combustor wall extending circumferentially around and axially along an axial centerline; and
a steam blanket injector disposed outside of the combustor and next to the combustor wall, the steam blanket injector including a plurality of steam outlets and a plurality of ports, the plurality of steam outlets arranged circumferentially around and axially along the combustor wall, the steam blanket injector configured to direct steam out of the plurality of steam outlets to cool the combustor wall, and each of the plurality of ports extending through the steam blanket injector to facilitate airflow across the steam blanket injector.

* * * * *